No. 790,151. PATENTED MAY 16, 1905.
E. A. ORR.
COMBINED HAY RAKE AND PRESS.
APPLICATION FILED AUG. 25, 1904.

4 SHEETS—SHEET 1.

Witnesses
C. Munter
C. H. Griesbauer

Inventor
Elbert A. Orr
by H. R. Wilson
Attorney

No. 790,151. PATENTED MAY 16, 1905.
E. A. ORR.
COMBINED HAY RAKE AND PRESS.
APPLICATION FILED AUG. 25, 1904.

4 SHEETS—SHEET 2.

Witnesses
C. Munson
C. H. Griesbauer.

Inventor
Elbert A. Orr.
by H. B. Willson
Attorney

No. 790,151. PATENTED MAY 16, 1905.
E. A. ORR.
COMBINED HAY RAKE AND PRESS.
APPLICATION FILED AUG. 25, 1904.

4 SHEETS—SHEET 4.

Witnesses
C. Munzer
C. H. Giersbauer

Inventor
Elbert A. Orr
by H. B. Willson
Attorney

No. 790,151.  
Patented May 16, 1905.

UNITED STATES PATENT OFFICE.

ELBERT ADAM ORR, OF HEPLER, KANSAS.

COMBINED HAY RAKE AND PRESS.

SPECIFICATION forming part of Letters Patent No. 790,151, dated May 16, 1905.

Application filed August 25, 1904. Serial No. 222,165.

*To all whom it may concern:*

Be it known that I, ELBERT ADAM ORR, a citizen of the United States, residing at Hepler, in the county of Crawford and State of Kansas, have invented certain new and useful Improvements in a Combined Hay Rake and Press; and I do declare the following to be a full, clear, and exact description of the invention, such as will enable others skilled in the art to which it appertains to make and use the same.

This invention relates to improvements in a combined hay rake and press.

The object of the invention is to provide a machine of this character whereby hay may be raked upon and conveyed to a pressing mechanism by which the same may be formed into bales, means being provided for elevating and feeding said hay to the pressing mechanism.

A further object is to provide means whereby said pressing or baling mechanism may be automatically operated, means being provided whereby hay may be admitted to the baling-chambers at the proper time.

Another object is to provide a double baling-chamber, so that while a bale is being formed in one chamber the bale which was previously formed in the other chamber is being removed, thereby enabling the machine to be continuously operated, means being provided whereby the baling-chambers may be readily opened and separated to permit the discharge of a finished bale, means being also provided whereby the shifting of the baling-chambers to readily bring the same beneath the feeding-chamber will be facilitated.

With these and other objects in view the invention consists of certain novel features of construction, combination, and arrangement of parts, as will be hereinafter more fully described, and particularly pointed out in the appended claims.

Figure 1:
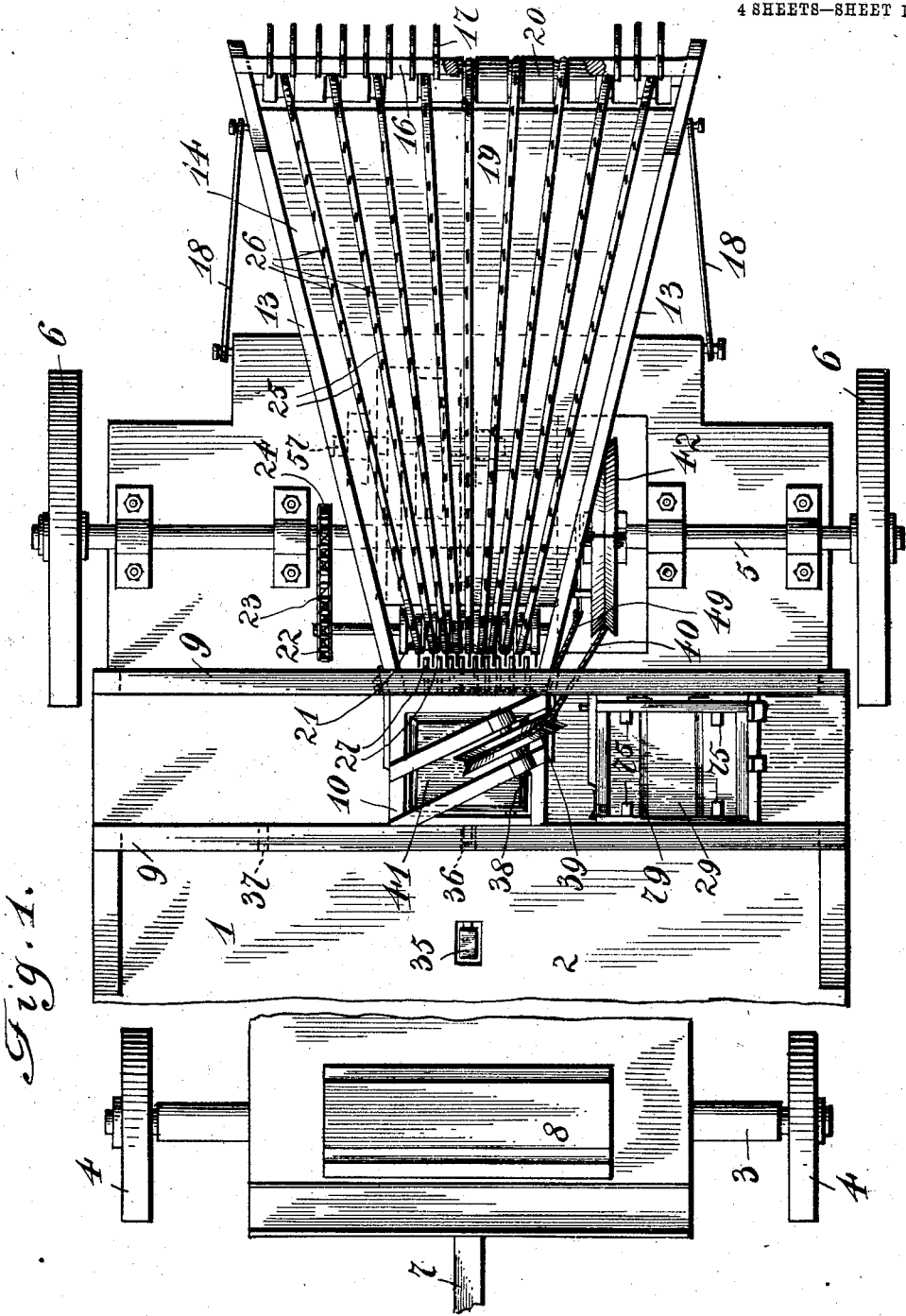
Figure 2:
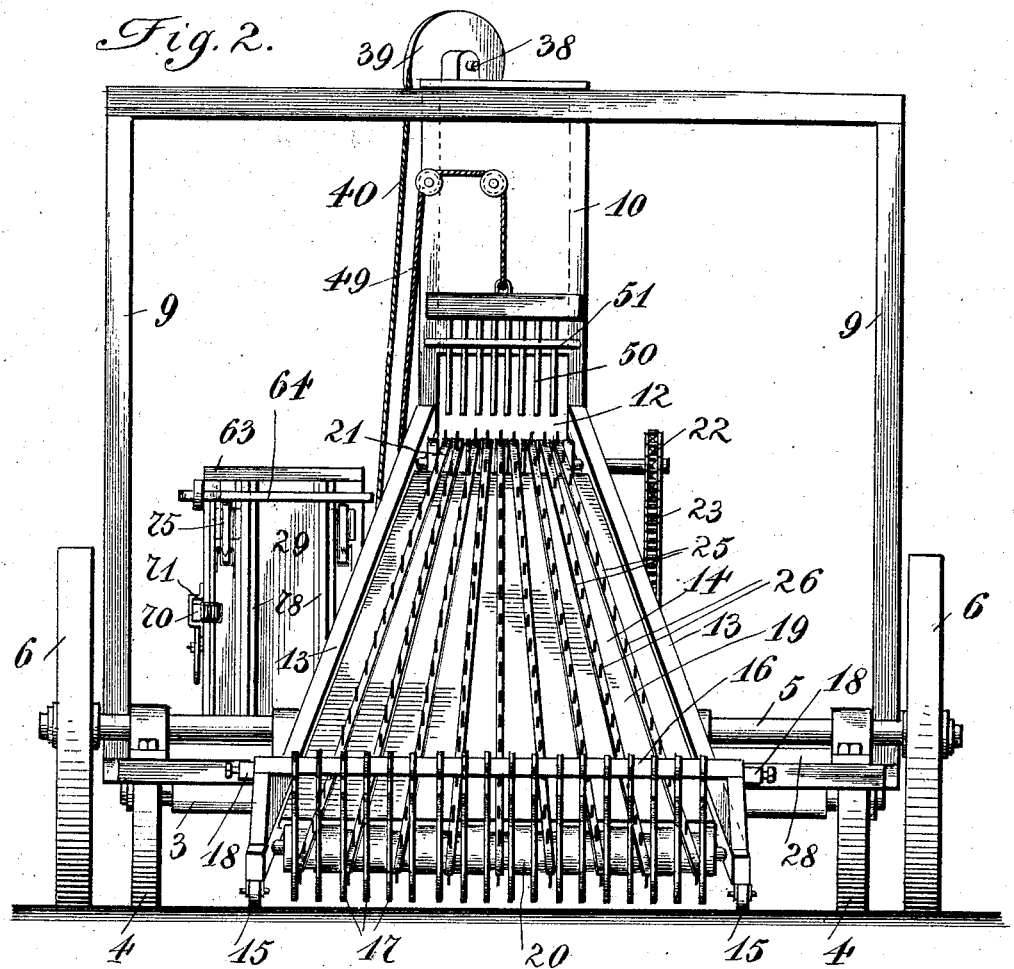
Figure 4:
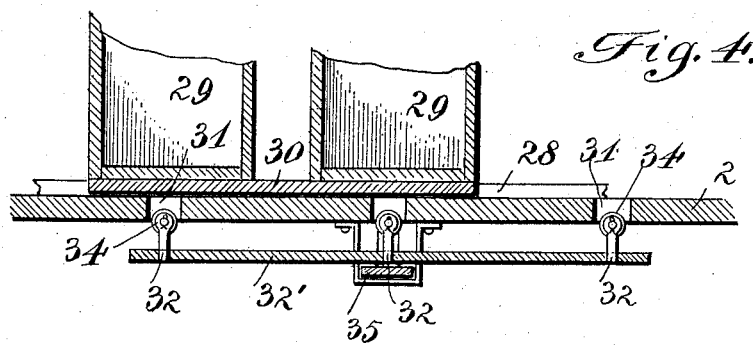
Figure 5:
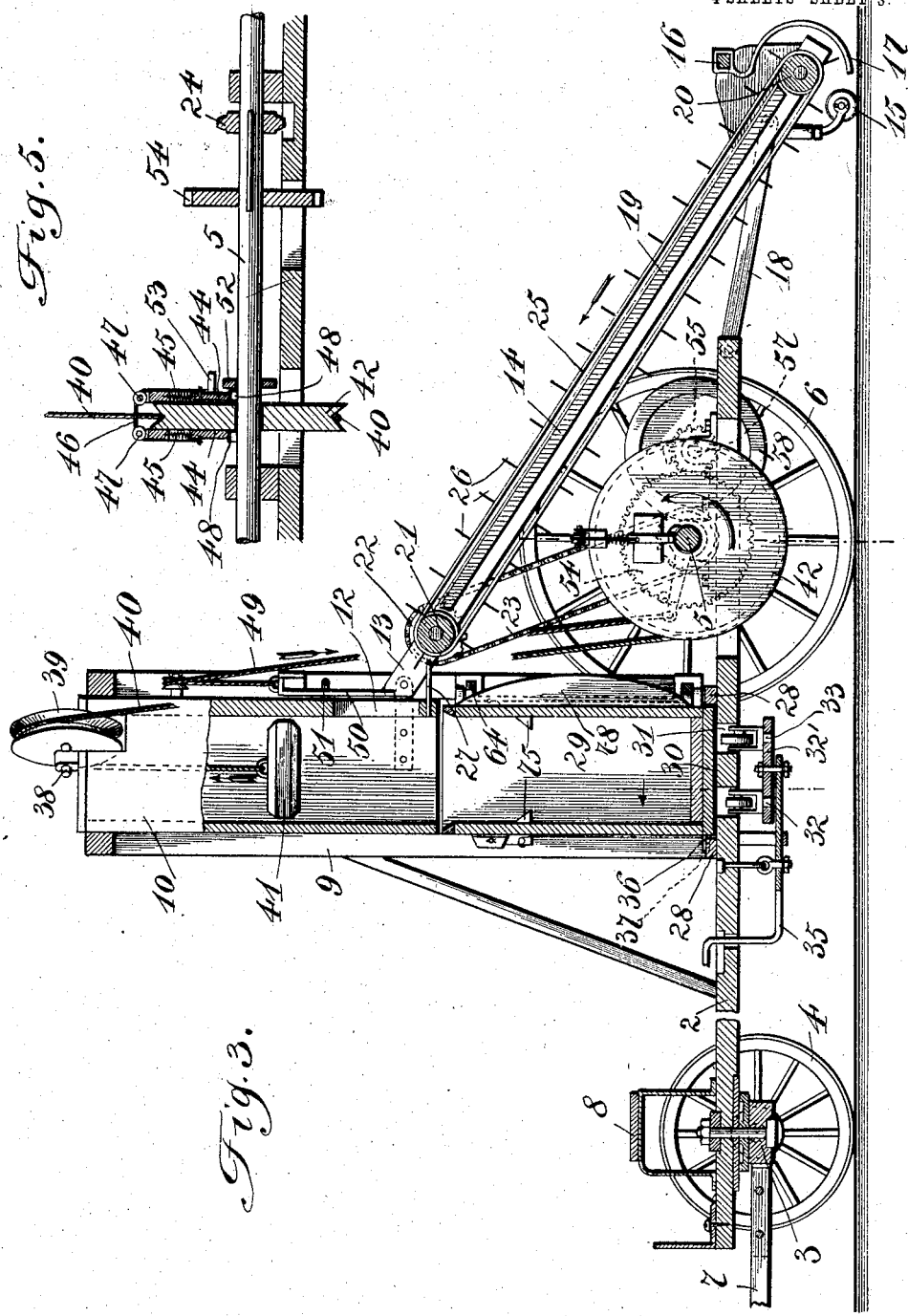
Figure 6:
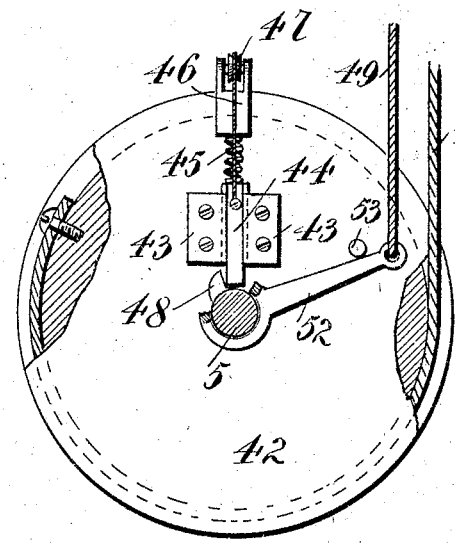
Figure 9:
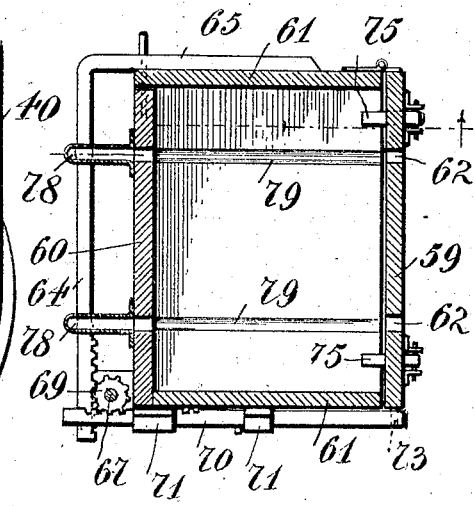
Figure 7:
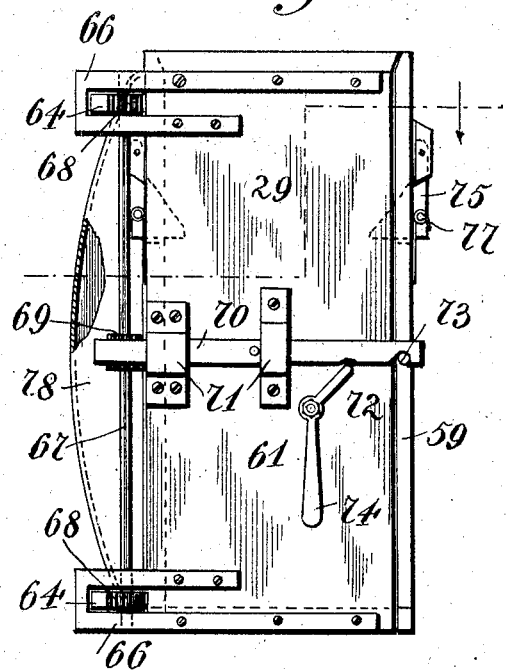
Figure 8:
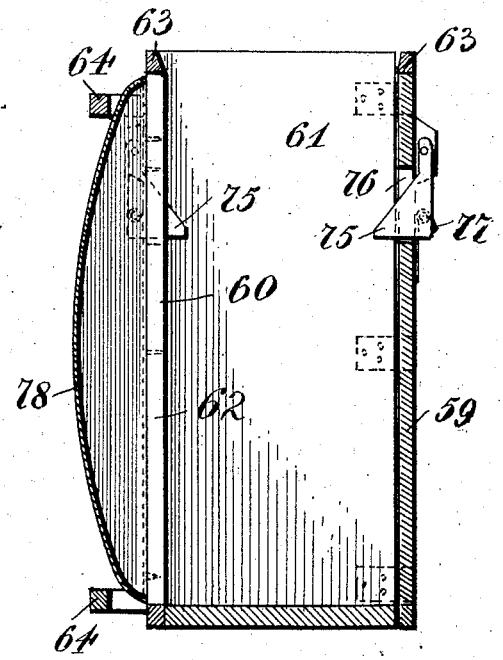

In the accompanying drawings, Figure 1 is a top plan view of the machine. Fig. 2 is a rear end elevation. Fig. 3 is a central vertical longitudinal section. Fig. 4 is a vertical cross-sectional view taken through the baling and feeding chamber. Fig. 5 is a similar view taken on a line with the rear axle and drive-shaft. Fig. 6 is a detail sectional view through the rear axle, showing the operating-wheel and the parts connected therewith. Fig. 7 is a detail side view of one of the baling-chambers. Fig. 8 is a vertical sectional view thereof, and Fig. 9 is a horizontal sectional view of the same.

Referring more particularly to the drawings, 1 denotes a truck consisting of a platform 2. To the forward end of said platform is pivotally connected a front axle 3, on the ends of which is journaled front supporting-wheels 4. On the rear end of the platform 2 is rotatably mounted a rear supporting-axle and drive-shaft 5, on the ends of which are fixedly mounted rear supporting and drive wheels 6.

To the forward ends of the machine may be connected a tongue 7 or other suitable draft mechanism. On the forward ends of the platform may be arranged a driver's seat 8. On the platform 2, adjacent to the rear axle or shaft 5, is formed an upright frame 9, at the upper portion of which is a vertically-disposed feed chamber or chute 10. In the lower rear side of said chute is formed a feed-opening 12. To the lower rear side of the feed chamber or chute 10 is connected the upper ends of the side bars 13 of an inclined triangularly-shaped rack-frame 14. To the lower ends of the side bars 13 are connected short vertically-disposed shafts, on the lower ends of which are swiveled rollers 15. The rollers 15 are adapted to support the lower end of the rack-frame 14 and by reason of their swiveled connection will turn and roll in any direction. On the upper edges of the side bars 13 near their lower ends is secured a horizontally-disposed cross-bar 16, on which is mounted a series of spring rake-teeth 17.

The lower ends of the side bars 13 are pivotally connected to the rear ends of the platform 2 by means of the rods or bars 18. Between the side bars 13 is arranged a triangularly-shaped platform 19, which forms part of a conveyer mechanism or feeder whereby the hay collected by said rake-teeth will be conducted to the feed-opening 12 in the chute or feed-chamber 10. Between the lower ends of the side bars 13, adjacent to the lower end of the platform 19, is journaled a roller 20, and between the upper ends of the side bars 13 is journaled a roller 21. One end of said roller 21 projects through the side bar 13 and has fixed thereon a sprocket-wheel 22, which is connected by a sprocket-chain 23 to a sprocket-wheel 24. The sprocket-wheel 24 is fixedly mounted upon the rear axle or drive-shaft 5, by which means the roller 21 is driven. Around the rollers 20 and 21 and the platform 19 is arranged a series of endless belts or straps 25, on each of which is formed a series of outwardly-projecting teeth 26. Motion is imparted to the belts 25 by the upper driven roller 21 to cause the same to travel up and around the inclined platform 19, the teeth of said belts taking the hay from the rack-teeth 17 and conveying the same upwardly and discharging it into the feed-opening 12 of the feed-chamber 10. Between the upper roller 21 and the lower end of the feed-chamber 10 is formed a space into which projects a series of teeth or bars 27, which project from and are fixed to the lower end of said feed-chamber and are adapted to take the hay from the teeth 26 on the belts 25 as said latter teeth pass between the same, thereby preventing the hay from being carried on around and also serving as a support for the hay which may accumulate while the pressing mechanism is forcing a charge into the baling-chamber.

On the platform 2 is arranged a guideway formed by guide-bars 28, in which is loosely mounted a pair of baling-chambers 29. Said chambers are normally adapted to rest loosely upon the platform 2 and in the guideway and are fixed to a common base-plate 30, by which connection they are adapted to be moved together across said platform to alternately bring one or the other of the same beneath the lower end of the feed chamber or chute 10.

In the platform 2, beneath the baling-chambers 29, is formed a series of apertures 31, and below said platform is arranged a plate 32. On the plate 32 is fixed a series of short upwardly-projecting shafts 32 and 33, in the upper ends of which are journaled rollers 34. The plate 32 is connected to the end of a pivoted foot-lever 35, which is pivotally mounted on the under side of the platform 2. The opposite end of the lever 35 is bent upwardly and passes through an opening in said platform, where it is adapted to be engaged by the foot of the operator and when pressed downwardly will raise the plate 32 and project the shafts 33 and rollers 34 upwardly through the apertures 31 and into engagement with the base-plate of the baling-chambers, slightly raising the same off of the platform 2, thereby permitting said chamber to be readily shifted to bring one or the other of the same beneath the feed-chamber. When the baling-chambers have been so shifted to the correct position, the foot-lever is released, thereby permitting the plate 32 to drop, thus disengaging the rollers from the base-plate 30 and allowing the baling-chambers to again engage the platform 2. In order that the baling-chambers may be held in position after being shifted, the base-plate 30 of the same is provided with a laterally-projecting lug or pin 36, which is adapted to engage notches or recesses 37, formed in one of the guideway-bars 28.

On the upper end of the frame 9 is journaled a shaft 38, on which is mounted a grooved pulley 39. Over the pulley 39 is adapted to play a hoisting-cable 40, one end of which extends downwardly into the feed-chamber 10 and has connected thereto a pressing-weight 41. The opposite end of the hoisting-cable 40 is connected to a grooved operating-wheel 42, which is loosely mounted on the rear drive-shaft or axle 5, as shown. On each side of the wheel 42 is secured a pair of guide-blocks 43, between which is adapted to slide a clutch-bar 44. The clutch-bar 44 is normally forced inwardly by means of a spring 45, which is arranged at the outer end of the same. To the outer ends of the clutch-bars 44 is connected the inner ends of a cord or cable 46, which is adapted to pass over and around the edge of the operating-wheel, where it engages a pair of grooved pulleys 47. The pulleys 47 are journaled in brackets secured to the opposite side of said operating-wheel and project laterally therefrom, as shown.

On the shaft or axle 5 on each side of the wheel 42 is fixed a beveled lug 48, which is adapted to engage the lower ends of the clutch-bars 44, thereby causing said wheel to be turned by said shaft in a direction to wind the hoisting-cable 40 around the grooved periphery of the same, thus hoisting the pressing-weight 41 upwardly in the feed-chamber 10. This movement of the wheel 42 will be continued until the portion of the cord 46 between the pulleys 47 is brought into engagement with the hoisting-cable 40. The pressure of the cord 46 against the hoisting-cable 40 will cause the clutch-bars 44 to be retracted against the tension of the springs 45, which will disconnect the wheel 42 from the shaft or axle 5, thereby permitting the same to be turned backward by the action of the weighted hoisting-cable, thus permitting the weight 40 to drop upon the hay which has been fed into the feed-opening 12 and force the same downwardly into the baling-chambers. As soon as the cord 46 has been disengaged from the hoisting-cable the clutch-bars 44 will be forced inwardly by the springs 45, so that the ends of the same will be again engaged by the lugs 48, thereby again locking the wheel 42 to said drive-shaft or axle 5.

Suspended upon the feed chamber or chute 10 by means of a hoisting-cord 49 is a gate 50. Said gate is adapted to be raised and lowered across the feed-opening 12 to open and close the same. The gate 50 is adapted to slide in a guide-loop 51, secured to the side of said feed-chute. In order that the gate 50 may be raised and lowered to open and close said opening at the proper time, a suitable operating mechanism is provided, said mechanism being here shown as consisting of a radially-projecting arm or bar 52. The arm or bar 52 is loosely mounted upon the axle or shaft 5 and is connected at its opposite end to the lower end of the hoisting-cord 49. On the side of the operating-wheel 42 adjacent to said arm is formed a laterally-projecting pin or stud 53, which is adapted to be engaged in said arm when said operating-wheel is turned by the shaft or axle 5. The position of the pin or stud 53 of said wheel is such that the same will engage the arm 52 to cause the latter to raise the gate 50 simultaneously with the raising of the weight 41, and upon the disconnecting of the wheel 42 from the shaft 5 to permit the weight 41 to drop, as hereinbefore described, the arm 52 will be released, thereby permitting the gate 50 to also drop, thus closing the feed-opening 12 and preventing further hay from being forced into the feed-chamber while the weight is in its lowered position.

On the axle or drive-shaft 5 is fixed a large spur gear-wheel 54, which is adapted to mesh with the spur gear-pinion 55, which is loosely mounted on a shaft 57, secured to the outer end of the platform 2. To said pinion is fixed a fly-wheel 58, which is also mounted on said shaft 57.

The baling-chambers 29 consist of rectangular-shaped vertically-disposed boxes, each of which consists of a front wall 59, a rear wall 60, and side walls 61. The front wall 59 is hingedly connected to one of the side walls, thereby forming a door to permit the removal of the bale formed in said chamber. Each of the front and rear walls 59 and 60 is preferably formed of three slats or bars, between which are formed spaces 62. Said slats are connected at their upper and lower ends by cross-bars 63. The walls of the baling-boxes are connected together to form sections which may be separated to a limited extent to disengage said side walls from a bale, thereby permitting the latter to be readily removed from said box. The hinged connection of the front wall 59 to one of the side walls 61 forms one section of the box, while the rear wall 60 is fixedly connected to the other side wall 61, thereby forming the other section of said chamber. In order that the sections of the box may be securely held together while the bale is being formed therein and to permit the same to be readily separated to discharge said bale, a suitable locking and releasing mechanism is provided. The locking mechanism preferably consists of rack-bars 64, having formed on one end right-angularly-disposed lugs 65, which are readily secured to the side of the box to which the front wall 59 is hinged. The rack-bars 64 are adapted to project across the face of the rear wall 60, the free ends of said bars 64 being adapted to engage and slide in guide-brackets 66, secured to and projecting rearwardly from the sides of the box to which the rear wall 60 is connected. Mounted on the rear wall 60, adjacent to one edge of the same, is a vertically-disposed shaft 67, on which, near the upper and lower ends of the same, is fixed spur-pinions 68. The pinions 68 are adapted to mesh with the teeth on the rack-bars 64, whereby when said shaft is rotated said rack-bars will be moved to open or close the sections of the box.

On the shaft 67, midway between the ends of the same, is fixed a spur gear-pinion 69, with which is adapted to be engaged the teeth of a combined rack and latch bar 70. Said bar 70 is slidably mounted in guide-brackets 71, fixed on the adjacent side walls 61 of the baling-box. In the lower side of the opposite end of the bar 70 is formed a notch 72, said notched end being adapted to engage a keeper 73, which is secured to the adjacent edge of the front wall or door 59 of the baling-chamber, whereby said door is held or locked in closed position.

Pivotally mounted upon the side wall 61, immediately below and adjacent to the notched end of the bar 70, is an operating-lever 74, the short end of which is bent into the form of a finger. Said finger is adapted to be engaged with the under side of the bar 70, whereby when the opposite end of the lever 74 is swung toward the operator said finger will lift the notched end of the bar sufficiently to disengage said end from the keeper 73, thereby unlocking the bar 59. A further movement of the lever 74 in an upward direction will project the bar 70 rearwardly, thereby engaging the teeth on the same with the pinion 69, thus revolving the shaft 67 and the pinions 68, fixed on the ends of the same. Said pinions meshing with the teeth on the rack-bars 64 will force the same laterally, thereby separating the two sections of the box or chamber.

On the front and rear walls of the baling-chambers are pivotally mounted stop-lugs 75, the lower ends of which are beveled upwardly and are adapted to project through slots 76 into the baling-chambers. Said lugs are normally forced into said chambers by means of coiled springs 77 and are adapted to engage and retain each charge of hay as the same is forced past the lugs by the pressing-weight 41, said lugs being forced outwardly by the weight as the same forces the charge of hay downwardly, and as soon as said weight is raised said lugs will be again forced inwardly by the springs 77, thus holding the hay down in the chamber.

On the outer side of the rear wall 60, over each of the spaces 62, is formed a curved or semi-elliptical-shaped hood or casing 78, said casing being adapted to receive the ends of baling-wires which are passed through the spaces 62 in the front wall 59 and across the upper end of the bale, through the spaces in the rear wall, and to turn said ends outwardly and direct the wires back through the spaces at the lower end of said rear walls and into grooves or channels 79, formed in the base-plate of the baling-chambers, and from thence out through the spaces at the lower ends of the front wall, where the two ends of the wires may be suitably joined to bind the bale in its compressed form. This arrangement of the hoods or casings for turning or directing the ends of the wires obviates the necessity of the operator going around to the rear of the baling-chamber to direct or turn the ends of the baling-wires, thus greatly facilitating the operation of tying the bales.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a press, the combination of a feed-chamber, a platform under the same, a bale-box movable on said platform under and into and out of register with the feed-chamber, vertically-movable antifriction devices, and means to raise and lower the same to support the bale-box to facilitate the movement of the latter.

2. In a press, the combination of a feed-chamber, a platform under the same and having openings, a bale-box movable on said platform under and into and out of register with the feed-chamber, a vertically-movable plate having antifriction devices adapted to be moved vertically in the openings in the platform, and means to raise and lower said plate and said antifriction devices.

3. In a press, the combination of a feed-chamber, a platform under the same and having openings, a bale-box movable on said platform under and into and out of register with the feed-chamber, a vertically-movable plate having antifriction devices adapted to be moved vertically in the openings in the platform, and a lever to raise and lower said plate and said antifriction devices.

4. The combination of a bale-forming mechanism having a feed-opening, means to feed material through said opening, a follower-weight, a hoisting-cable connected to said follower-weight, a loosely-mounted revoluble operating-wheel to wind up said cable and raise said follower-weight, and means to release said wheel, to permit said cable to unwind and said follower-weight to drop, substantially as described.

5. The combination of a bale-forming mechanism having a feed-opening, means to feed material through said opening, a follower-weight, a cable to raise the same, an operating-wheel to which said cable is attached, means including a clutch device to rotate said wheel to wind said cable and raise said follower-weight, and means actuated by said cable to release said clutch device and permit said wheel to reversely turn to unwind said cable and allow said weight to drop.

6. The combination of a bale-forming mechanism having a feed-chamber provided with a feed-opening, a feeder to supply material to said feed-chamber through said opening, a gravity-gate to close said feed-opening, a follower-weight, a cable connected to said weight, an operating-wheel to which said cable is attached, means including a clutch device to rotate said wheel to wind said cable and raise said weight, means actuated by said cable to release said clutch device and permit said wheel to turn reversely to unwind said cable and drop said weight, a cord to raise said gravity-gate, and means operated by said wheel to close said gate when the weight is dropped and thereby prevent material from being fed to the feed-chamber, substantially as described.

7. The combination of a bale-forming chamber having a feed-chamber provided with a feed-opening, a feeder to feed material to said chamber through said opening, a follower-weight, a driving-shaft, an operating-wheel loosely mounted on said shaft, a hoisting-cable attached to said operating-wheel and said follower-weight, a clutch device to lock said wheel to said shaft when released by said hoisting-cable, a gravity-gate, to open and close the feed-opening, a releasing-cord for said gate, an arm loosely mounted on said shaft and to which said hoisting-cord is attached, and means actuated by said operating-wheel to engage said arm and cause the same to raise the gate simultaneously with the raising of the follower-weight.

8. In a press, the combination of a platform, a frame thereon, a feeding-chamber fixed to said frame, a pair of baling-chambers slidable on said platform under said feeding-chamber, upwardly-projecting rollers under said baling-chambers, and means to move said rollers upwardly to raise said baling-chambers and permit the same to be shifted under the feeding-chamber.

9. In a press, the combination of a platform, a frame thereon, a feeding-chamber in said frame, a pair of baling-chambers slidably mounted on said platform and each comprising rectangular upright side walls connected in separable sections, a hinged door, and means whereby said hinged door may be opened and said sections separated.

10. In a press, the combination of a platform, a frame thereon, a feeding-chamber fixed in said frame, a pair of baling-chambers slidably mounted on said platform and each comprising rectangular upright side walls connected in separable sections, rack-bars connected to one of said sections, a shaft journaled on the other section, pinions on said shafts to engage said rack-bars, a hinged door arranged in one of said sections, a combined latch and rack bar adapted to engage a pinion on said shaft, a keeper on said door, for the purpose set forth, and means whereby said latch and rack bar is actuated to release said door and separate said sections.

11. In a press, the combination of a platform, a frame thereon, a feeding-chamber carried by said frame, a pair of baling-chambers slidably mounted on said platform and each comprising rectangular upright sides or walls, material catching and retaining devices in said chambers, a hinged door forming one of the sides or walls of said chamber, means to hold said door closed, means for freeing a bale from between the walls of said chamber, and means whereby a baling-wire when projected through one end of said chamber is returned to the other end thereof.

12. In a press, the combination of a platform, a frame mounted thereon, a feeding-chamber carried by said frame, a pair of baling-chambers slidably mounted on said platform and each comprising rectangular upright walls or sides, and curved guideways arranged on one side of each chamber, for the purpose set forth.

In testimony whereof I have hereunto set my hand in presence of two subscribing witnesses.

BERT ORR.

Witnesses:
 FRED WONN,
 L. H. DE VRIES.